(12) United States Patent
Yamada et al.

(10) Patent No.: US 11,948,753 B2
(45) Date of Patent: Apr. 2, 2024

(54) MANUFACTURING METHOD OF MULTILAYER CERAMIC ELECTRONIC DEVICE

(71) Applicant: TAIYO YUDEN CO., LTD., Tokyo (JP)

(72) Inventors: Kazuki Yamada, Takasaki (JP); Kotaro Mizuno, Takasaki (JP); Yoichi Kato, Takasaki (JP); Hidetoshi Masuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 18/327,805

(22) Filed: Jun. 1, 2023

(65) Prior Publication Data

US 2023/0326680 A1 Oct. 12, 2023

Related U.S. Application Data

(62) Division of application No. 17/372,401, filed on Jul. 9, 2021, now Pat. No. 11,710,601.

(30) Foreign Application Priority Data

Oct. 30, 2020 (JP) ................................. 2020-182105

(51) Int. Cl.
*H01G 4/30* (2006.01)
*C04B 35/468* (2006.01)
(Continued)

(52) U.S. Cl.
CPC ............ *H01G 4/30* (2013.01); *C04B 35/4682* (2013.01); *H01G 4/008* (2013.01); *H01G 4/012* (2013.01);
(Continued)

(58) Field of Classification Search
CPC .......... H01G 4/30; H01G 4/008; H01G 4/012; H01G 4/1218; H01G 4/1227; H01G 4/2325; C04B 35/4682; C04B 2235/65
See application file for complete search history.

(56) References Cited

U.S. PATENT DOCUMENTS 4,097,911 A 6/1978 Dorrian
2004/0256603 A1* 12/2004 Celik .................... C22C 1/0425
252/500
(Continued)

FOREIGN PATENT DOCUMENTS

CN 105408974 A 3/2016
CN 110197767 A 9/2019
(Continued)

OTHER PUBLICATIONS

A Request for the Submission of an Opinion issued by Korean Intellectual Property Office on Nov. 13, 2023, for Korean counterpart application No. 10-2021-0132878 (4 pages).
(Continued)

*Primary Examiner* — Michael P McFadden
(74) *Attorney, Agent, or Firm* — Law Office of Katsuhiro Arai

(57) ABSTRACT

A manufacturing method of a multilayer ceramic electronic device includes: forming each of stack units by forming each of internal electrode patterns on each of dielectric green sheets, the each of internal electrode patterns including Ni, Sn and Au; forming a multilayer structure by stacking the each of stack units; and firing the multilayer structure, whereby each internal electrode layer is formed from the each of internal electrode patterns and each dielectric layer is formed from the each of the dielectric green sheets wherein, in the each internal electrode layer, an Au concentration near each interface between the each internal elec- (Continued)

trode layer and the each dielectric layer is larger than an Au concentration in each center portion in a thickness direction.

6 Claims, 9 Drawing Sheets

(51) Int. Cl.
*H01G 4/008* (2006.01)
*H01G 4/012* (2006.01)
*H01G 4/12* (2006.01)

(52) U.S. Cl.
CPC ....... *H01G 4/1218* (2013.01); *C04B 2235/65* (2013.01)

(56) References Cited

U.S. PATENT DOCUMENTS

| | | | |
|---|---|---|---|
| 2008/0073665 A1* | 3/2008 | Slater | H01L 24/32 438/455 |
| 2009/0304545 A1* | 12/2009 | Tanaka | B23K 35/26 420/560 |
| 2010/0013095 A1* | 1/2010 | Hada | H01L 24/29 257/E23.023 |
| 2010/0208410 A1 | 8/2010 | Okada et al. | |
| 2013/0321979 A1 | 12/2013 | Park et al. | |
| 2013/0321980 A1 | 12/2013 | Suzuki et al. | |
| 2015/0155098 A1* | 6/2015 | Yamaguchi | H01G 13/00 156/89.16 |
| 2016/0155571 A1 | 6/2016 | Doi et al. | |
| 2019/0027311 A1 | 1/2019 | Chigira | |
| 2019/0267189 A1 | 8/2019 | Makino | |
| 2019/0371526 A1 | 12/2019 | Ubukata et al. | |
| 2019/0378655 A1 | 12/2019 | Iwai et al. | |

FOREIGN PATENT DOCUMENTS

| | | |
|---|---|---|
| JP | H0432213 A | 2/1992 |
| JP | 2005505695 A | 2/2005 |
| JP | 2007039755 A | 2/2007 |
| JP | 2019021816 A | 2/2019 |
| TW | 201908268 A | 3/2019 |
| TW | 202004794 A | 1/2020 |
| WO | 2014024538 A1 | 2/2014 |

OTHER PUBLICATIONS

A Notice of Reasons for Refusal issued by the Japanese Patent Office, dated Apr. 11, 2023, for Japanese counterpart application No. 2020-182105. (2 pages).

An Office Action issued by Taiwan Intellectual Property Office, dated Apr. 26, 2022, for Taiwan counterpart application No. 110126465. (6 pages).

Non-Final Office Action issued by U.S. Patent and Trademark Office, dated Feb. 7, 2023, for U.S. related U.S. Appl. No. 17/372,401 (16 pages).

Notice of Allowance issued by U.S. Patent and Trademark Office, dated Jun. 21, 2023, for U.S. related U.S. Appl. No. 17/372,401 (9 pages).

A First Office Action issued by the State Intellectual Property Office of China dated Jan. 4, 2024, for Chinese counterpart application No. 202111185883.4 (8 pages).

* cited by examiner

MANUFACTURING METHOD OF MULTILAYER CERAMIC ELECTRONIC DEVICE

CROSS-REFERENCE TO RELATED APPLICATION

This application is a divisional application of U.S. patent application Ser. No. 17/372,401, filed Jul. 9, 2021, which is based upon and claims the benefit of and priority to Japanese Patent Application No. 2020-182105, filed Oct. 30, 2020, each entire disclosure of which is herein incorporated by reference. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to a ceramic electronic device and a manufacturing method of the ceramic electronic device.

BACKGROUND

Ni (nickel) is used as internal electrode layers of a ceramic electronic device such as a multilayer ceramic capacitor. Atmosphere of the firing process may be reductive atmosphere in order to prevent oxidation of Ni. However, when the reductive atmosphere is used in the firing process, oxygen vacancies are generated in dielectric layers. Therefore, reliability of the ceramic electronic device may be degraded. And so, there is disclosed a technology in which the reliability of the ceramic electronic device may be improved by adding Sn to internal electrodes made of Ni (for example, see International Publication No. 2014/024538 and Japanese Patent Application Publication No. 2005-505695).

SUMMARY OF THE INVENTION

However, when Ni is used for the internal electrodes, there is a room for improvement in the lifetime characteristic of the ceramic electronic device.

According to an aspect of the present invention, there is provided a ceramic electronic device including; a multilayer chip in which a plurality of dielectric layers of which a main component is ceramic and a plurality of internal electrode layers are stacked, wherein the plurality of internal electrode layers include Ni, Sn and Au.

According to another aspect of the present invention, there is provided a manufacturing method of a ceramic electronic device including: forming each of stack units by forming each of internal electrode patterns on each of dielectric green sheets, the each of internal electrode patterns including Ni, Sn and Au; forming a multilayer structure by stacking the each of stack units; and firing the multilayer structure.

DETAILED DESCRIPTION

A description will be given of an embodiment with reference to the accompanying drawings.

Figure 1:
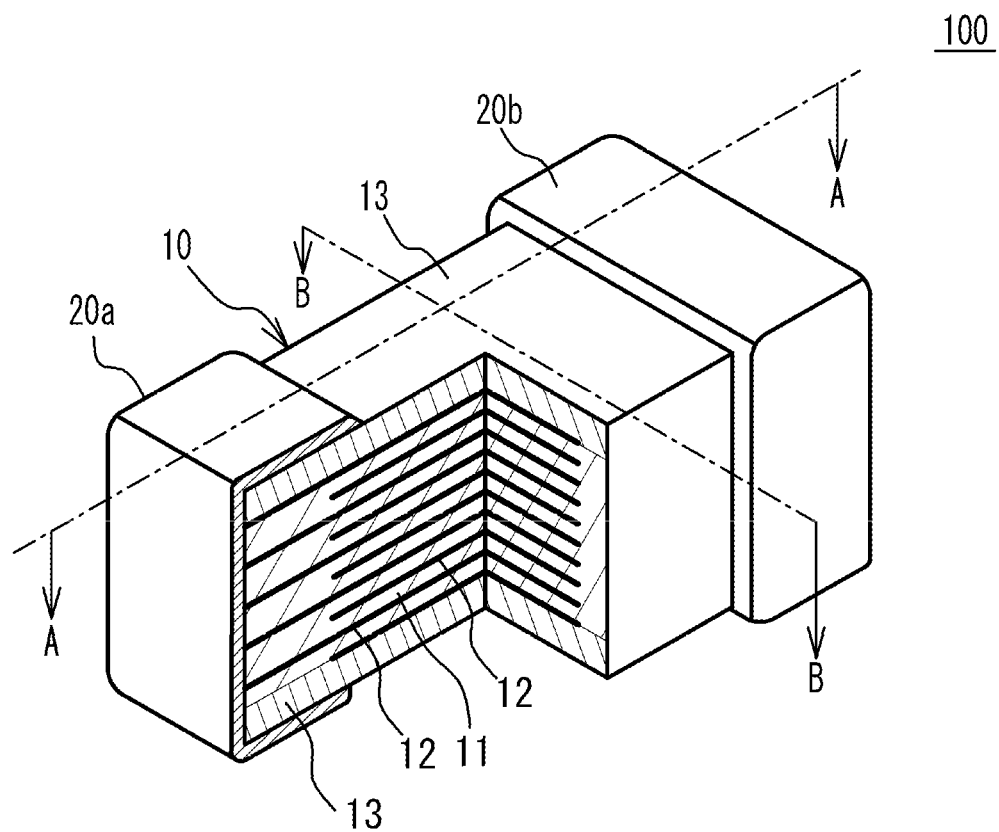
FIG. 1 illustrates a perspective view of a multilayer ceramic capacitor in which a cross section of a part of the multilayer ceramic capacitor is illustrated.
Figure 2:
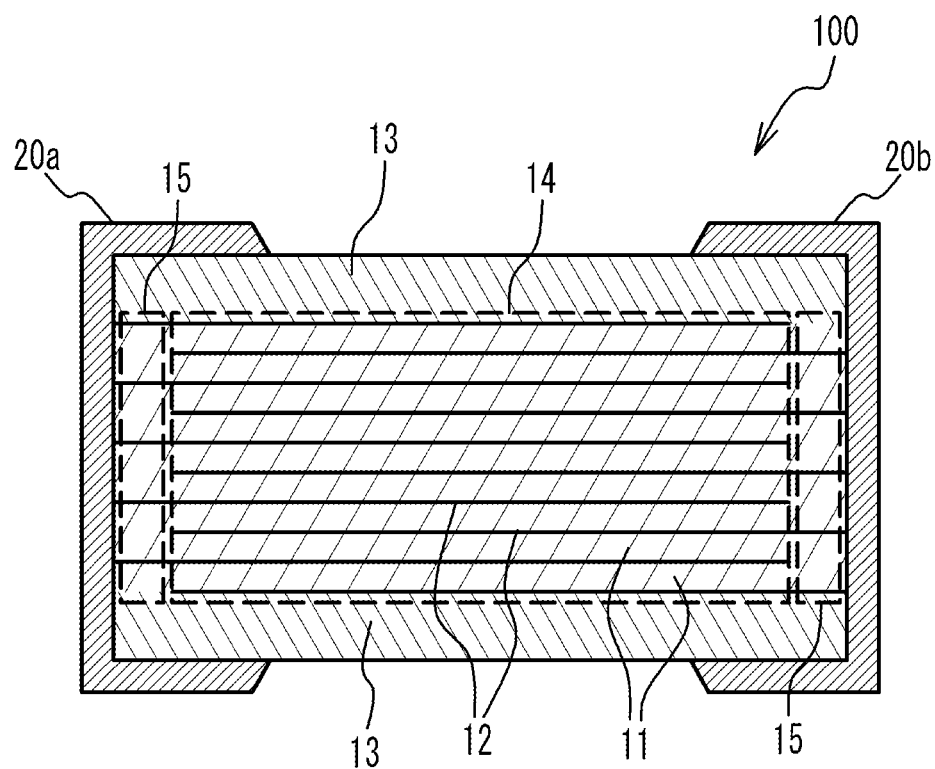
FIG. 2 illustrates a cross sectional view taken along a line A-A of FIG. 1.
Figure 3:
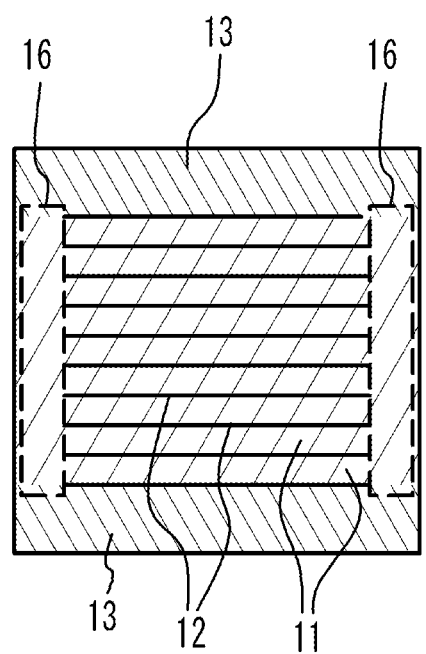
FIG. 3 illustrates a cross sectional view taken along a line B-B of FIG. 1.

(First Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other. In FIG. 1, an X-axis direction (first direction) is a length direction of the multilayer chip 10. In the X-axis direction, the two end faces of the multilayer chip 10 are opposite to each other. Moreover, in the X-axis direction, the external electrode 20a is opposite to the external electrode 20b. A Y-axis direction (second direction) is a width direction of the internal electrode layers. A Z-axis direction is the stacking direction. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of each of the dielectric layers 11 may be, for example, 0.05 μm or more and 5 μm or less. The average thickness may be 0.1 μm or more and 3 μm or less. The average thickness may be 0.2 μm or more and 1 μm or less.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. And so, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

When Ni is used for the internal electrode layers 12 in the multilayer ceramic capacitor 100, the reliability of the dielectric layers 11 may be degraded because oxygen vacancies are generated in the dielectric layers 11. For example, when the atmosphere in the firing process is reductive in order to suppress oxidization of Ni, the oxygen vacancies may be easily generated in the dielectric layer 11. When the thickness of the dielectric layer 11 including the vacancies is reduced and a voltage having a high field intensity is applied to the dielectric layer 11, the durability of the dielectric layer 11 may be insufficient. In this case, the lifetime of the multilayer ceramic capacitor 100 may be short. Alternatively, there is a variation in the lifetimes. That is, the lifetime characteristic may be degraded. And so, the multilayer ceramic capacitor 100 has a structure for improving the lifetime characteristic.

The internal electrode layer s12 includes Sn in addition to Ni. When the internal electrode layers 12 include Ni and Sn, the lifetime of the multilayer ceramic capacitor 100 may be improved. For example, when Ni and Sn form an alloy, the condition of the interface between the internal electrode layer 12 and the dielectric layer 11 changes. In this case, it is thought that the lifetime of the multilayer ceramic capacitor 100 may be improved.

Next, when Ni of the internal electrode layer 12 diffuses into the dielectric layer 11, sufficient lifetime of the multilayer ceramic capacitor 100 may not be necessarily achieved. The mechanism is not clarified. Therefore, it is favorable that the diffusion of Ni to the dielectric layer 11 from the internal electrode layer 12 is suppressed. And so, the present inventors have researched the influence of the additives to the internal electrode layers 12 on the diffusion of Ni.

Four samples were prepared. A sample, in which an internal electrode pattern (thickness was 200 nm) made of Ni was formed on a dielectric green sheet of which a main component was barium titanate by a sputtering, was prepared as a first sample. A sample, in which Ni paste of 3.3 μg was printed on a dielectric green sheet of which a main component was barium titanate, was prepared as a second sample. A sample, in which an internal electrode pattern (Sn concentration was 3.2 at %. Thickness was 200 nm) was formed on a dielectric green sheet of which a main component was barium titanate by a sputtering, was prepared as a third sample. A sample, in which an internal electrode pattern (Au concentration was 1.0 at %. Thickness was 200 nm) was formed on a dielectric green sheet of which a main component was barium titanate by a sputtering, was prepared as a fourth sample.

Each sample was fired within 1100 degrees C. to 1300 degrees C. in a reductive atmosphere of which an oxygen partial pressure was $10^{-5}$ atm to $10^{-8}$ atm. A Ni concentration in dielectric layers was measured with use of La-ICP (Laser Ablation Inductively Coupled Plasma Mass Spectrometry). A relationship between a distance from an internal electrode layer and a Ni concentration ratio (Ni/Ti) at % was measured.

Figure 4:
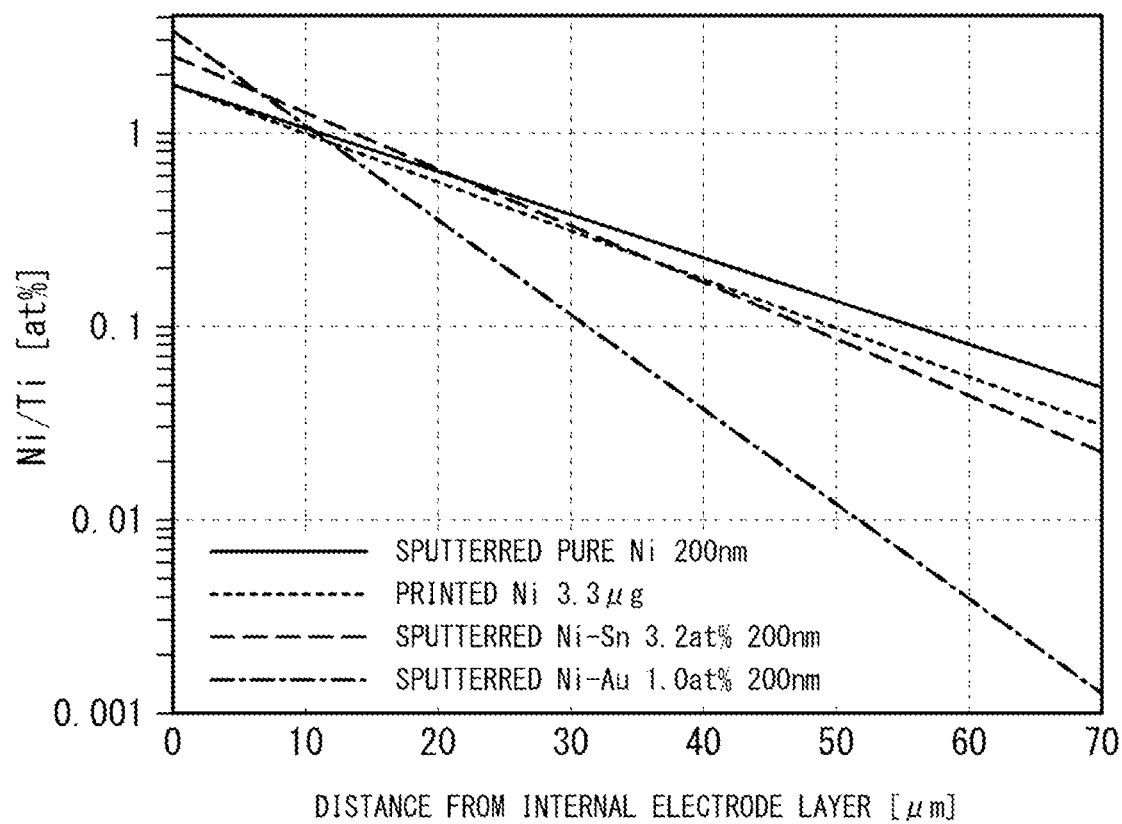
FIG. 4 illustrates influence of an additive to an internal electrode layer on diffusion of Ni.

FIG. 4 illustrates the results. As illustrated in FIG. 4, the Ni concentration became high at a distance from the internal electrode layer, in the first sample, the second sample and the third sample. It is thought that this was because Ni diffused in the firing process. On the other hand, in the fourth sample, the Ni concentration became low at a distance from the internal electrode layer. It is thought that this was because the diffusion of Ni was suppressed in the firing process. From the results, it was confirmed that the diffusion of Ni into the dielectric layer was suppressed because Au was added to the internal electrode layer.

And so, the internal electrode layer 12 includes Sn and Au in addition to Ni. When the internal electrode layer 12 includes Au, Au acts as a barrier against the diffusion of Ni.

The diffusion of Ni to the dielectric layer 11 is further suppressed. Thus, the durability of the dielectric layer 11 against the applied voltage having a high field intensity is improved. Therefore, the lifetime of the multilayer ceramic capacitor 100 is improved. When the lifetime is improved, a short lifetime is not included. Therefore, the variation of the lifetimes is suppressed. Therefore, the lifetime characteristic of the multilayer ceramic capacitor 100 is improved.

Each thickness of the internal electrode layers 12 may be, for example, 0.01 µm or more and 5 µm or less. Each thickness of the internal electrode layers 12 may be 0.05 µm or more and 3 µm or less. Each thickness of the internal electrode layers 12 may be 0.1 µm or more and 1 µm or less.

When the amount of Sn in the internal electrode layer 12 is small, it may be difficult to control the condition of the interface between the internal electrode layer 12 and the dielectric layer 11. When the amount of Au is small, it may be difficult to sufficiently suppress the diffusion of Ni. And so, it is preferable that the total amount of Sn and Au has a lower limit. For example, in the internal electrode layer 12, it is preferable that a ratio of the total amount of Sn and Au with respect to the amount of Ni is 0.01 at % or more. It is more preferable that the ratio is 0.05 at % or more. It is still more preferable that the ratio is 0.1 at % or more. It is still more preferable that the ratio is 0.2 at % or more.

On the other hand, when the total amount of Sn and Au is large, the melting point of the internal electrode layer 12 may be reduced or a cost may increase. And so, it is preferable that the total amount of Sn and Au has an upper limit. For example, in the internal electrode layer 12, it is preferable that the ratio of the total amount of Sn and Au with respect to the amount of Ni is 95 at % or less. It is more preferable that the ratio is 50 at % or less. It is still more preferable that the ratio is 10 at % or less.

When the ratio of the total amount of Sn and Au with respect to the amount of Ni is 0.2 at % or more and 10 at % or less, it is possible to control the condition of the interface between the internal electrode layer 12 and the dielectric layer 11 and suppress the diffusion of Ni even if the amount of Au is smaller than the amount of Sn. Accordingly, when the ratio of the total amount of Sn and Au with respect to the amount of Ni is 0.2 at % or more and 10 at % or less, it is preferable that the amount of Au is smaller than the amount of Sn from a viewpoint of reducing the amount of An and reducing the cost.

Figure 5A:
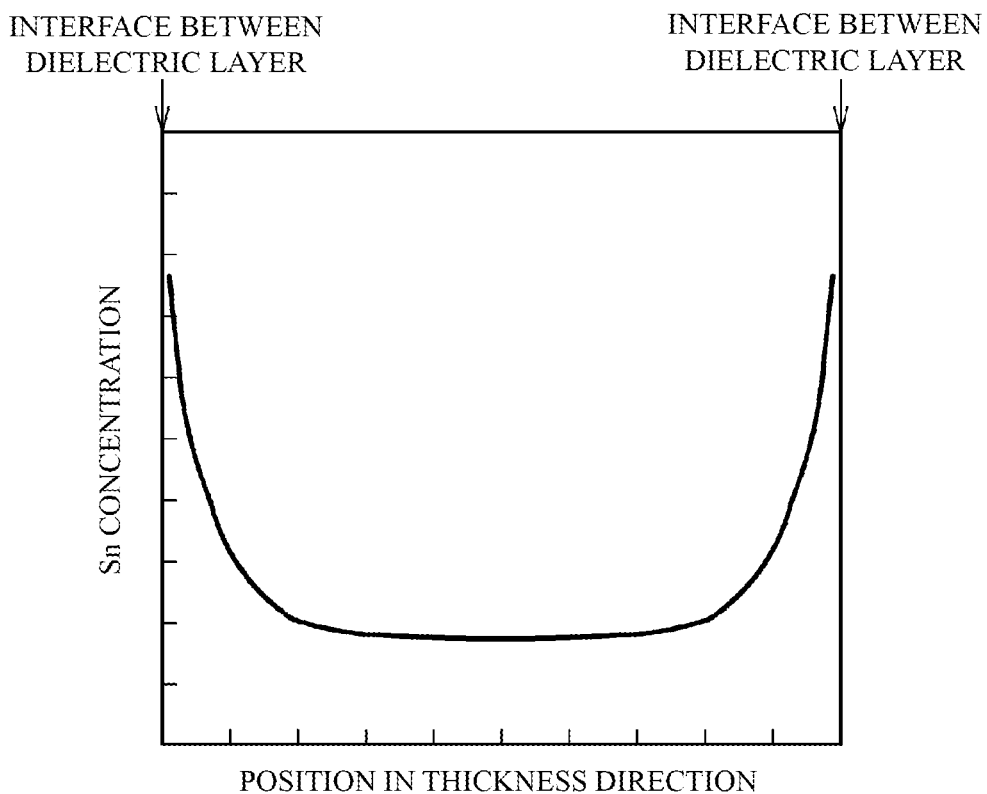
FIG. 5A an Sn concentration in an internal electrode layer.
Figure 5B:
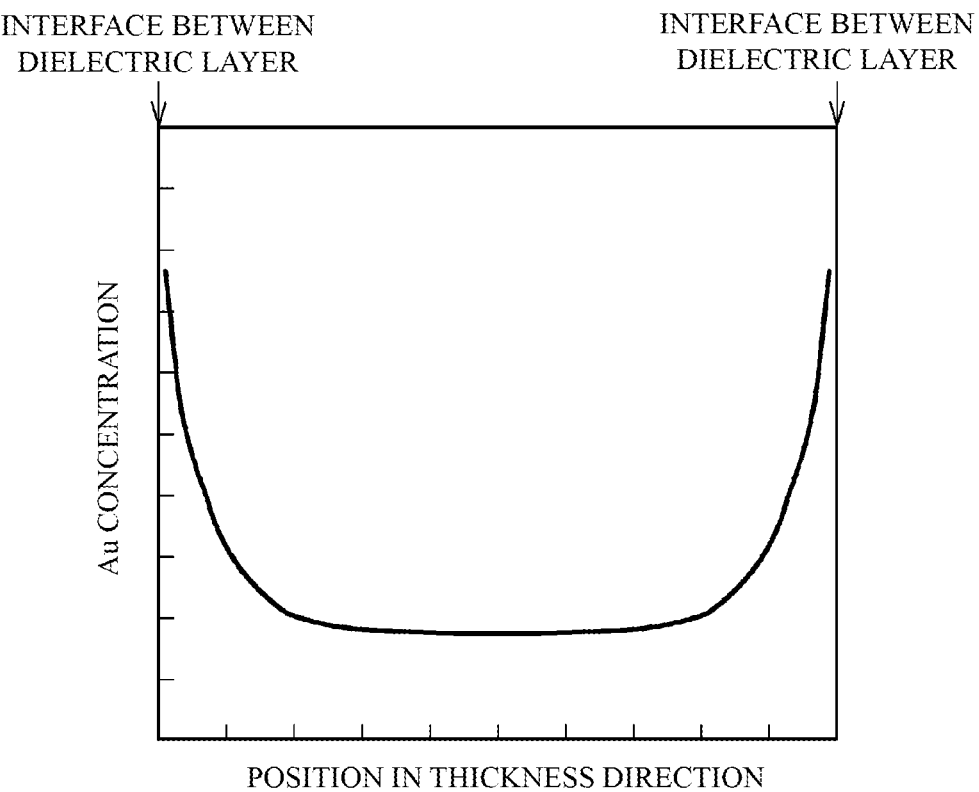
FIG. 5B illustrates an Au concentration in an internal electrode layer.

It is preferable that the Sn concentration is high near the interface between the internal electrode layer 12 and the dielectric layer 11. This is because the whole of the internal electrode layer does not have a large influence on the reliability, but only the vicinity of the interface between the dielectric layer 11 and the internal electrode layer 12 has a large influence on the reliability. Accordingly, as illustrated in FIG. 5A, it is preferable that the internal electrode layer 12 has a concentration graduation in which the Sn concentration is small in a center portion of the internal electrode layer 12 in the thickness direction, and the Sn concentration is high in the vicinity of the interface between the internal electrode layer 12 and the dielectric layer 11. In the vicinity of the interface between the internal electrode layer 12 a As illustrated in FIG. 5B, it is preferable that, in the internal electrode layer 12, the Au concentration is high in the vicinity of the interface between the internal electrode layer 12 and the dielectric layer 11. This is because the diffusion of Ni into the dielectric layer 11 is effectively suppressed. Accordingly, it is preferable that the internal electrode layer 12 has a concentration graduation in which the Au concentration is low in the center portion of the internal electrode layer 12 in the stacking direction, and the Au concentration is high in the vicinity of the interface between the dielectric layer 11 and the internal electrode layer 12.

Figure 6:
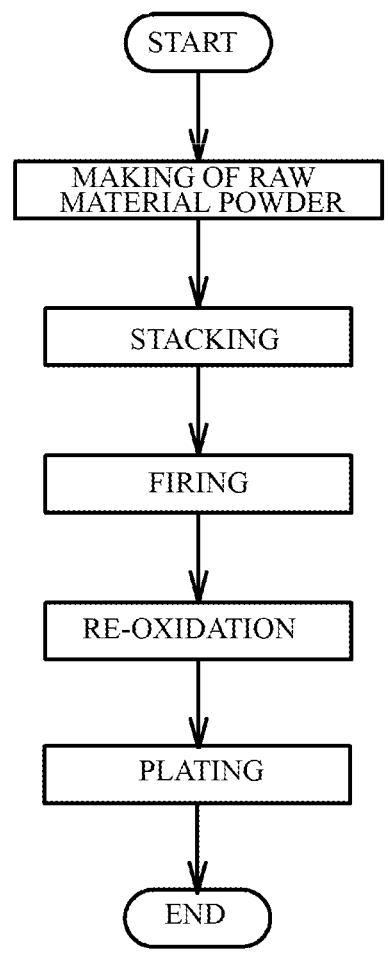
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to the resulting ceramic powder, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 with a thickness of 0.5 µm or more and 1.0 µm is painted on a base material 51 by, for example, a die coater method or a doctor blade method, and then dried. The base material 51 is, for example, PET (polyethylene terephthalate) film.

Figure 7A:
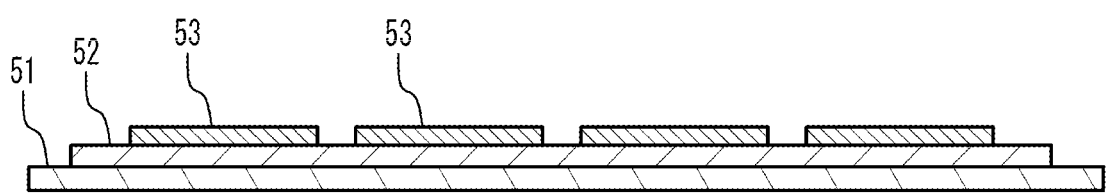
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The forming method is not limited. For example, electrode paste including a mixture of Ni, Sn and Au may be used. Ni metal powder paste including Au and Sn may be used. A vacuum deposition method such as a sputtering method using an alloy target may be performed. A simultaneous sputtering using individual targets may be performed. The dielectric green sheet 52 on which the internal electrode pattern 53 is formed is a stack unit.

Figure 7B:
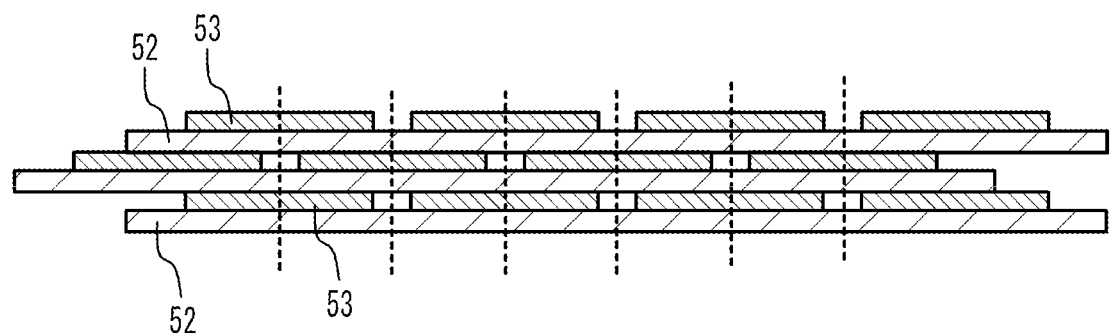

Next, the dielectric green sheets 52 are peeled from the base materials 51. As illustrated in FIG. 7B, the stack units are stacked.

A predetermined number (for example, 2 to 10) of a cover sheet is stacked on an upper face and a lower face of a ceramic multilayer structure of the stacked stack units and is thermally clamped. The resulting ceramic multilayer structure is cut into a chip having a predetermined size (for example, 1.0 mm×0.5 mm). In FIG. 7B, the multilayer structure is cut along a dotted line. The components of the cover sheet may be the same as those of the dielectric green sheet 52. Additives of the cover sheet may be different from those of the dielectric green sheet 52.

(Firing process) The binder is removed from the ceramic multilayer structure in $N_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b.

In the manufacturing method of the embodiment, the internal electrode layer 12 includes Sn and Au in addition to Ni. Thus, the lifetimes of the multilayer ceramic capacitors are improved. When the lifetimes are improved, a short lifetime is not included. In this case, variation of the lifetimes gets smaller. Therefore, the lifetime characteristic of the multilayer ceramic capacitors 100 is improved.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Example 1) An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. The thickness of the dielectric green sheet was 1.0 μm.

Next, an internal electrode pattern was formed on the dielectric green sheet by using paste including a Ni—Sn—Au alloy. An atomic concentration ratio of Ni/Sn/Au was 96/2/2.

Next, the dielectric green sheet was peeled from the base material. A plurality of the stack units were stacked. The temperature in the stacking process was 80 degrees C. The resulting ceramic multilayer structure was pressed with 4 MPa. The time for pressing was 5 seconds. Next, a predetermined number of a cover sheet was stacked on an upper face and a lower face of the ceramic multilayer structure of the stacked stack units and was thermally clamped by hydrostatic pressure. The pressure of the hydrostatic pressure was 120 MPa. The temperature in the pressing was 100 degrees C. The time for the pressing was 25 seconds. After that, the resulting ceramic multilayer structure was cut into a chip having a predetermined size (1.0 mm×0.5 mm×0.5 mm).

The binder was removed from the ceramic multilayer structure in $N_2$ atmosphere. Metal paste to be the base layers of the external electrodes was applied to the ceramic multilayer structure by a dipping method. The ceramic multilayer structure was fired in a reductive atmosphere.

(Example 2) The atomic concentration ratio of Ni/Sn/Au was 99.6/0.2/0.2. Other conditions were the same as those of the example 1.

(Example 3) The atomic concentration ratio of Ni/Sn/Au was 80/10/10. Other conditions were the same as those of the example 1.

(Comparative example 1) Neither Sn nor Au was added to the internal electrode layers. Other conditions were the same as those of the example 1.

(Comparative example 2) The concentration of Au in the internal electrode layers was the same as that of the example 1. However, Sn was not added to the internal electrode layers. Other conditions were the same as those of the example 1.

(Comparative example 3) The concentration of Sn in the internal electrode layers was the same as that of the example 1. However, Au was not added to the internal electrode layers. Other conditions were the same as those of the example 1.

(Lifetime test) Each time until each sample of the examples 1 to 3 and the comparative examples 1 to 3 was broken down was measured. In the test, each time until a leak current under a direct electric field of 18V/μm at 150 degrees C. became 10 times as a minimum leak current was measured.

Figure 8:
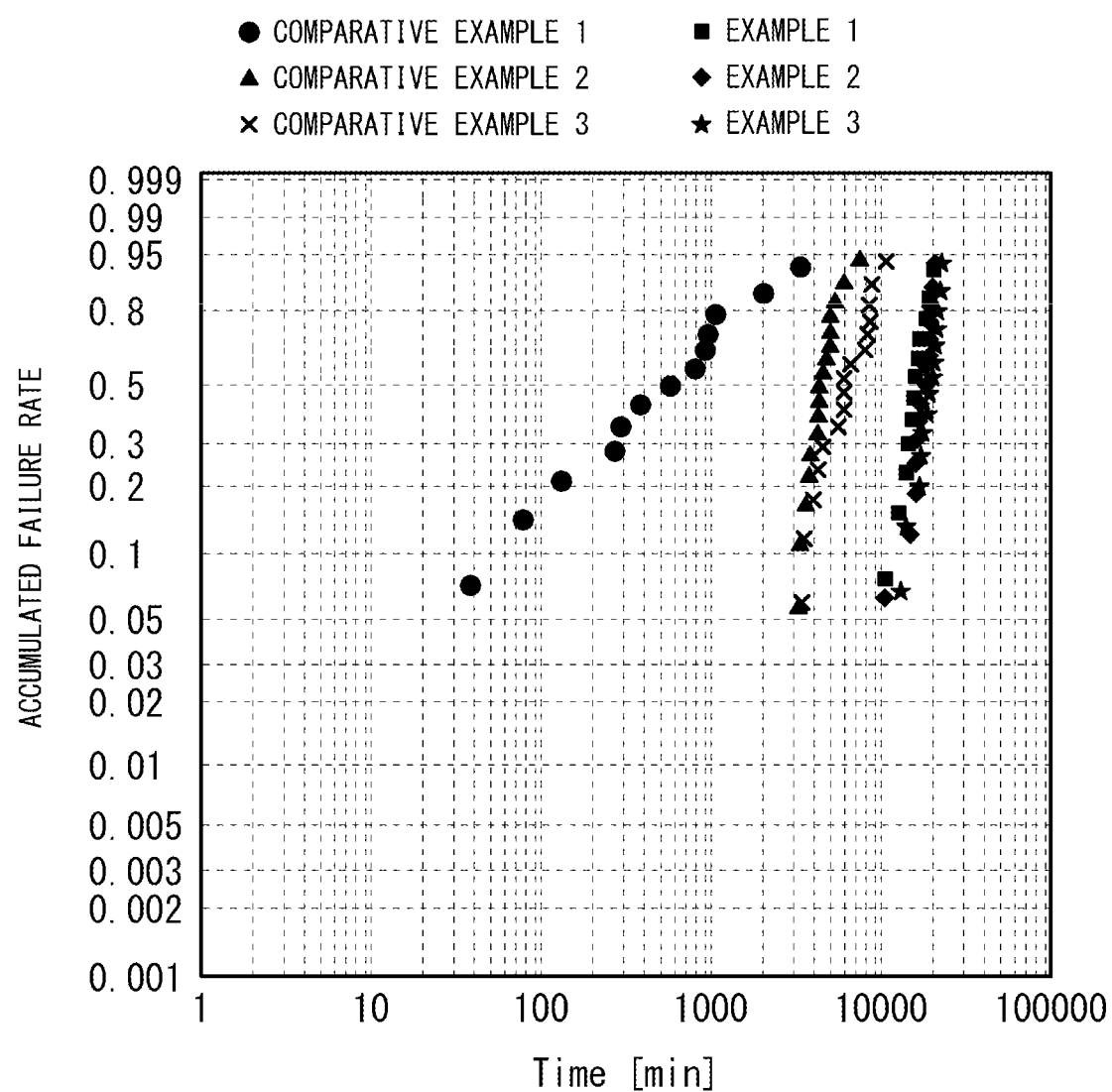
FIG. 8 illustrates a Weibull plot indicating a relationship between a time until breakdown and an accumulated failure rate of examples and a comparative example.

FIG. 8 illustrates a Weibull plot indicating a relationship between a time until the breakdown and an accumulated failure rate of the examples 1 to 3 and the comparative example. Table 1 shows inclinations of the Weibull plot of FIG. 8. Table 1 shows times with which 50% numbers of samples were broken down, with respect to each of the examples 1 to 3 and the comparative example.

TABLE 1

| | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|
| INCLINATION | 0.81 | 3.00 | 4.88 | 5.73 | 5.44 | 6.26 |
| 50% FAILURE TIME (min) | 530 | 6159 | 4511 | 17163 | 15387 | 18314 |

As shown in FIG. 8 and table 1, in the comparative example 1, the inclination of the Weibull plot was small. The number of samples of which the lifetime was short was large. The lifetime differences between the samples were large. It is thought that this was because the internal electrode layers included neither Sn nor Au. In the comparative example 2, the lifetime was longer than that of the comparative example 1. However, sufficient lifetime was not achieved. It is thought that this was because the diffusion of Ni was not sufficiently suppressed because Sn was added to Ni of the internal electrode layers but Au was not added to Ni of the internal electrode layers. In the comparative example 3, the lifetime was longer than that of the comparative example 1. However, sufficient lifetime was not achieved. It is thought that this was because the interfaces between the internal electrode layers and the dielectric layers were not sufficiently controlled because Au was added to Ni of the internal electrode layers but Sn was not added to Ni of the internal electrode layers.

In contrast, each lifetime of the samples of the examples 1 to 3 was long. The inclinations of the Weibull plot were large. The variation of the lifetime was small. It is thought that this was because both Sn and Au were added to Ni of the internal electrode layers.

Figure 9B:
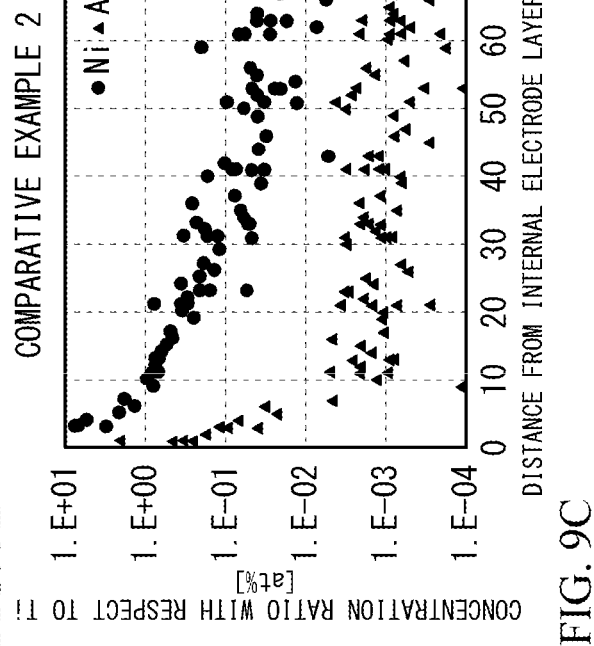
FIG. 9A to FIG. 9C illustrate a Ni concentration in a dielectric layer.
Figure 9C:
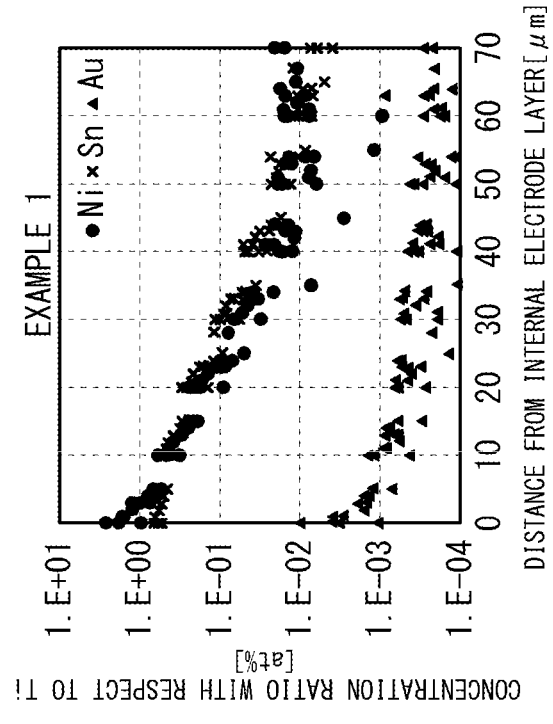
Figure 9A:
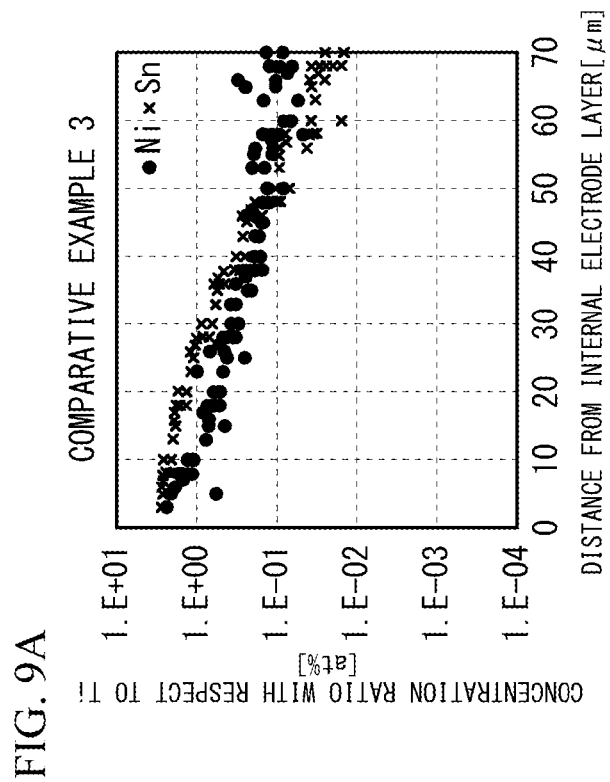

The Ni concentration of the dielectric layers was measured with use of La-ICP, with respect to the example 1 and the comparative examples 2 and 3. FIG. 9A illustrates the results of the comparative example 3. FIG. 9B illustrates the results of the comparative example 2. FIG. 9C illustrates the results of the example 1. As illustrated in FIG. 9A, when Au was not added to the internal electrode layers, a lot of Ni diffused into the dielectric layers. On the other hand, as illustrated in FIG. 9B, when Au was added to the internal electrode layers instead of Sn, the diffusion amount of Ni into the dielectric layers was small. Moreover, as illustrated in FIG. 9C, when both Sn and Au were added to the internal electrode layers, the diffusion amount of Ni into the dielectric layers got smaller. It is thought that the results influenced on the results of table 1.

Although the embodiments of the present invention have been described in detail, it is to be understood that the various change, substitutions, and alterations could be made hereto without departing from the spirit and scope of the invention.

The invention claimed is:

1. A manufacturing method of a multilayer ceramic electronic device, comprising:
    forming each of stack units by forming each of internal electrode patterns on each of dielectric green sheets, the each of internal electrode patterns including Ni, Sn and Au;
    forming a multilayer structure by stacking the each of stack units; and
    firing the multilayer structure, whereby each internal electrode layer is formed from the each of internal electrode patterns and each dielectric layer is formed from the each of the dielectric green sheets wherein, in the each internal electrode layer, an Au concentration near each interface between the each internal electrode layer and the each dielectric layer is larger than an Au concentration in each center portion in a thickness direction.

2. The manufacturing method as claimed in claim 1, wherein, in the forming of the each of stack units, the each of internal electrode patterns is formed on the each of dielectric green sheet by a vacuum deposition process.

3. The manufacturing method as claimed in claim 1, wherein a total content of Sn and Au relative to Ni in the each internal electrode layer is 0.01 at % or more and 95 at % or less.

4. The manufacturing method as claimed in claim 1, wherein a total content of Sn and Au relative to Ni in the each internal electrode layer is 0.2 at % or more and 10 at % or less.

5. The manufacturing method as claimed in claim 1, wherein a content of Au is smaller than a content of Sn in the each internal electrode layer.

6. The manufacturing method as claimed in claim 1, wherein, in the each internal electrode layer, a Sn concentration near the each interface is larger than a Sn concentration in the each center portion.

* * * * *